(12) United States Patent
Shepherd

(10) Patent No.: US 6,698,777 B1
(45) Date of Patent: Mar. 2, 2004

(54) DYNAMICALLY ADJUSTABLE MOTION STABILIZER

(76) Inventor: John D. Shepherd, 13833 Bruns Rd., Manhattan, IL (US) 60442

( * ) Notice: Subject to any disclaimer, the term of this patent is extended or adjusted under 35 U.S.C. 154(b) by 0 days.

(21) Appl. No.: 10/305,895

(22) Filed: Nov. 27, 2002

(51) Int. Cl.⁷ ................................................ B62D 7/22
(52) U.S. Cl. ................................. 280/89.11; 180/421
(58) Field of Search ........................... 280/89.11, 89.12, 280/89.13; 180/421, 422, 441; 74/388 PS, 495, 496

(56) References Cited

U.S. PATENT DOCUMENTS

| | | | |
|---|---|---|---|
| 1,223,573 A | 4/1917 | Eldredge | |
| 4,230,309 A | 10/1980 | Schnitzius | |
| 4,359,123 A | * 11/1982 | Haupt et al. | ................ 180/436 |
| 4,406,473 A | 9/1983 | Sexton | |
| 4,410,193 A | * 10/1983 | Howard | ....................... 280/90 |
| 4,418,931 A | * 12/1983 | Howard | ..................... 280/89.11 |
| 4,534,577 A | * 8/1985 | Howard | ...................... 180/400 |
| 4,736,931 A | 4/1988 | Christopherson | |
| 4,822,012 A | 4/1989 | Sketo | |
| 4,993,522 A | 2/1991 | Wagner | |
| 5,481,871 A | * 1/1996 | McFadyen | ................... 60/385 |
| 5,527,053 A | * 6/1996 | Howard | ....................... 280/90 |
| 5,816,594 A | * 10/1998 | Howard | ....................... 280/90 |
| 6,126,154 A | 10/2000 | Shepherd | |
| 6,237,904 B1 | 5/2001 | Shepherd | |
| 6,267,395 B1 | * 7/2001 | Howard | ................... 280/89.11 |
| 6,296,089 B1 | 10/2001 | Koch et al. | |
| 6,347,573 B1 | 2/2002 | Henkel et al. | |
| 6,520,520 B2 | * 2/2003 | Howard | ....................... 280/90 |

\* cited by examiner

*Primary Examiner*—Matthew C. Graham
*Assistant Examiner*—Benjamin A Pezzlo
(74) *Attorney, Agent, or Firm*—Donald R. Schoonover

(57) ABSTRACT

A dynamically adjustable motion stabilizer, including a motion stabilizer in combination with a centering adjustment mechanism for yieldingly urging a relatively movable load member toward a normal or centered position relative to another load member, includes a telescoping body that shortens (retracts) as the load members move toward one another and lengthens (extends) as the load members move apart. The centering adjustment mechanism includes a spring assembly, a locking mechanism structured to lock the spring assembly, a releasing mechanism structured to unlock the locking mechanism, and a control mechanism structured to control the releasing mechanism.

10 Claims, 7 Drawing Sheets

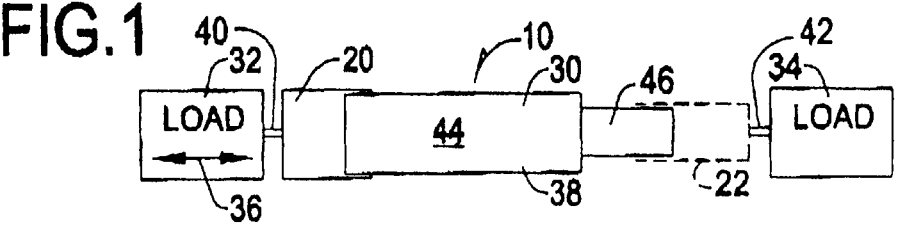
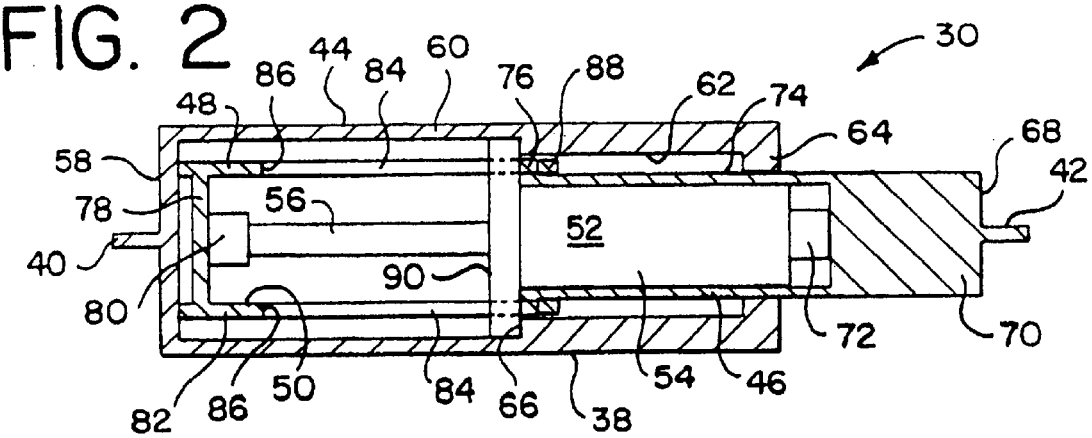
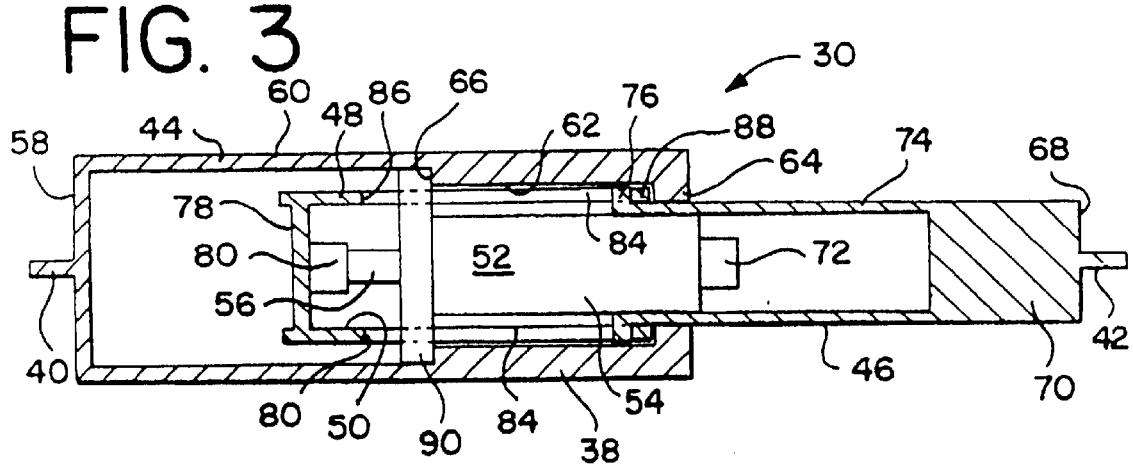
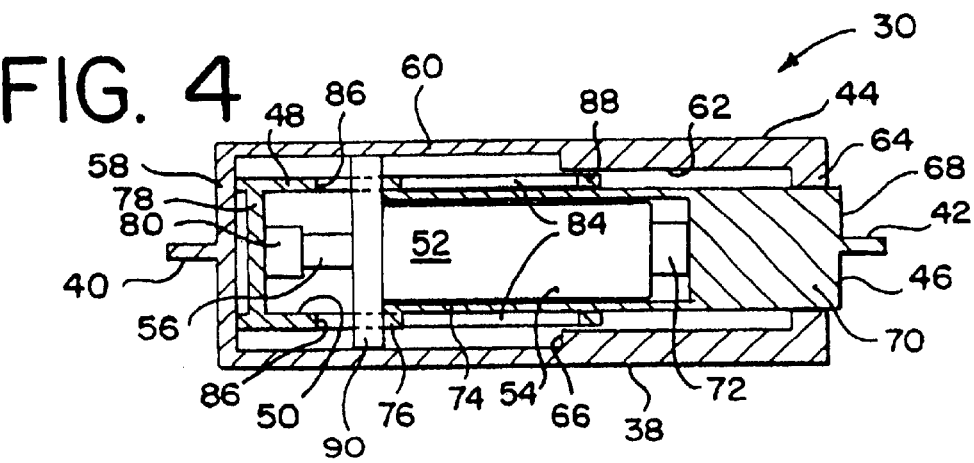

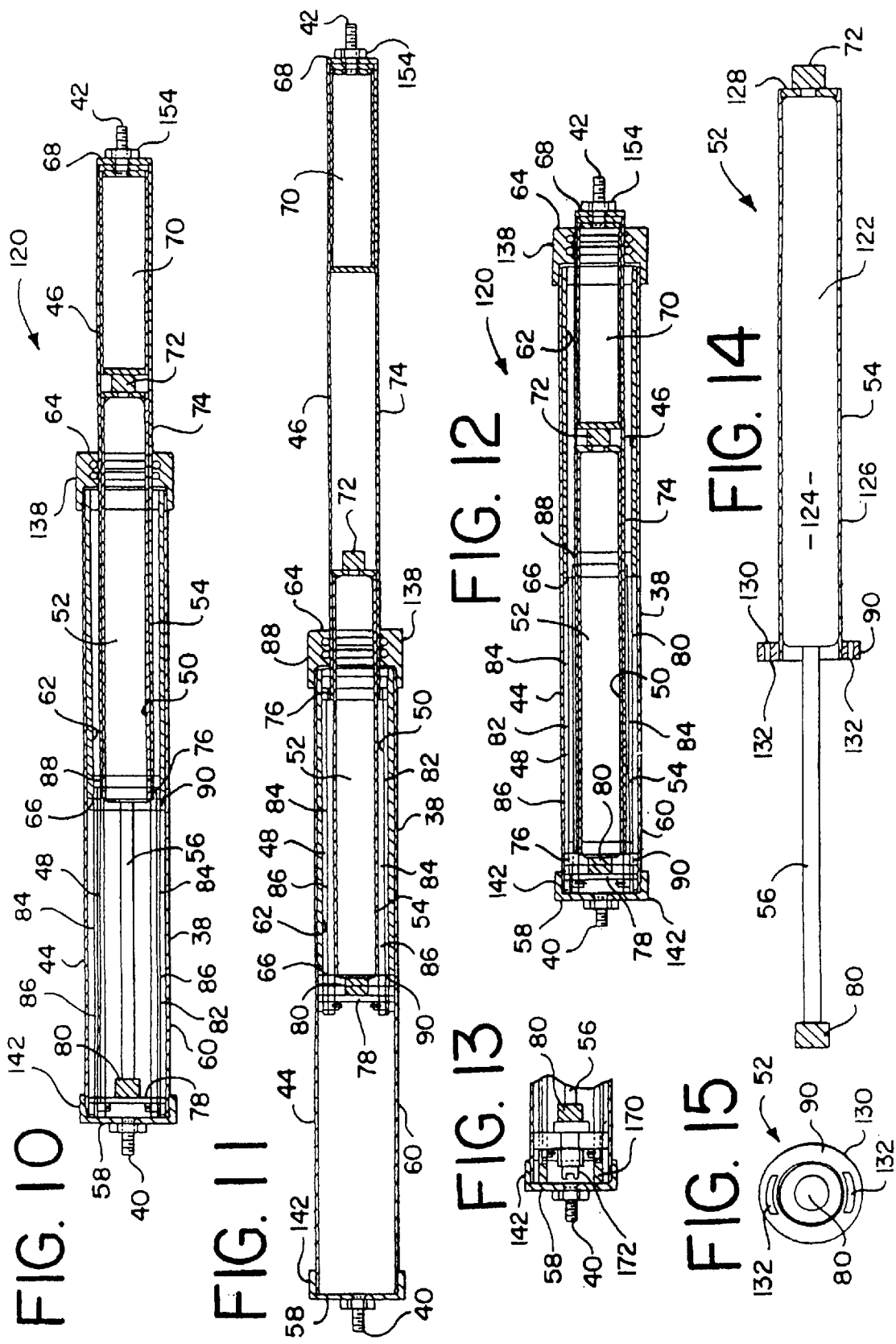

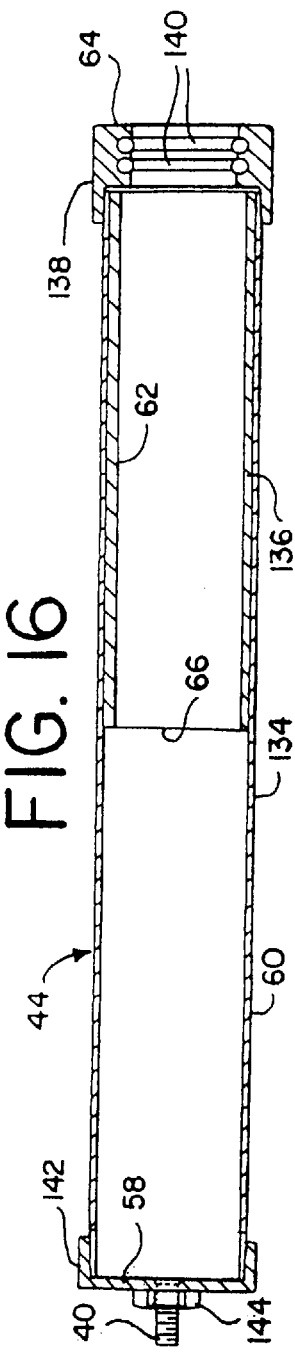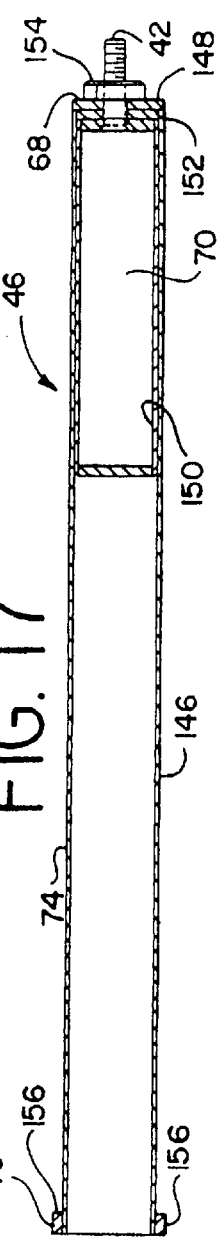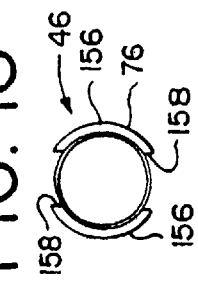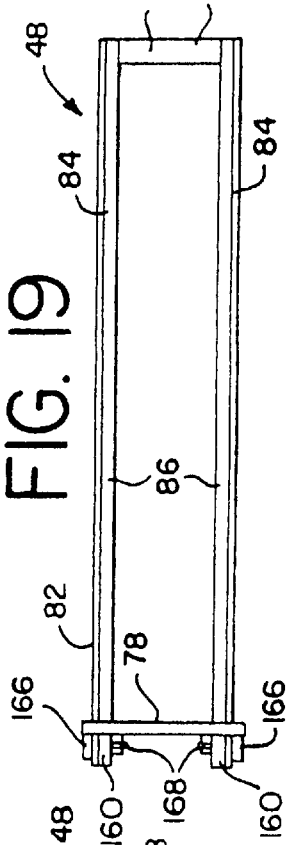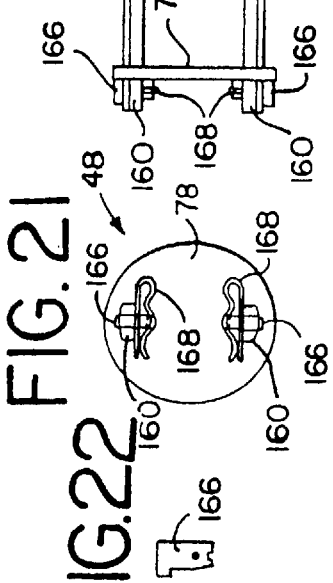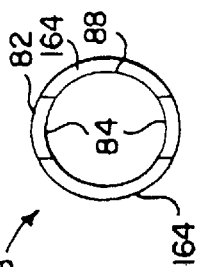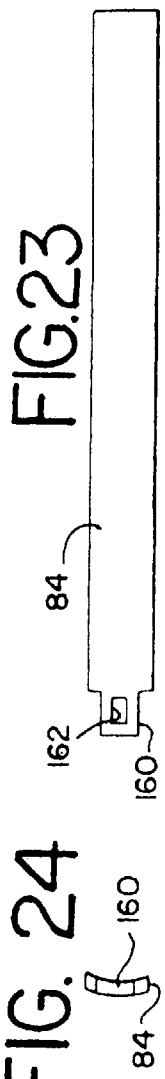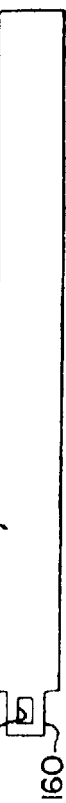

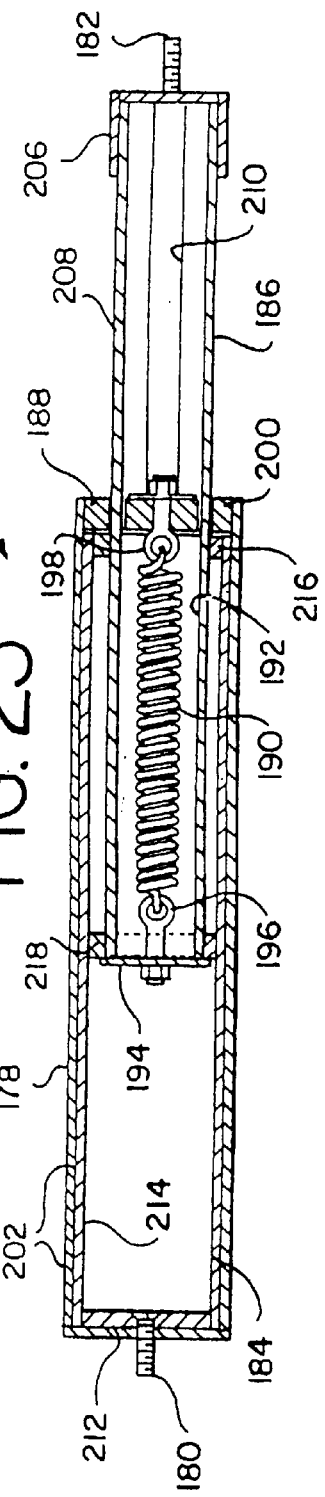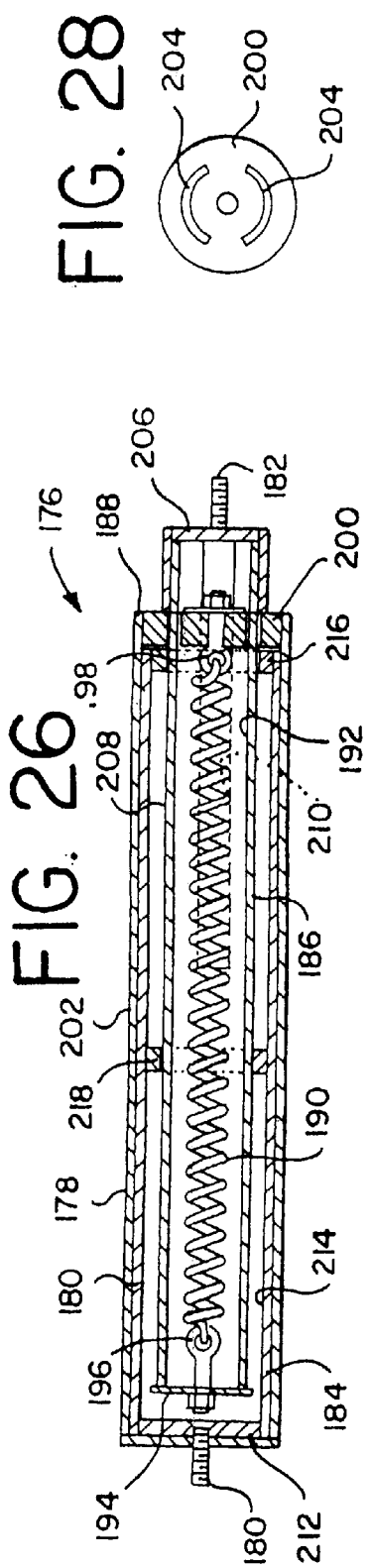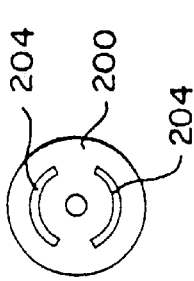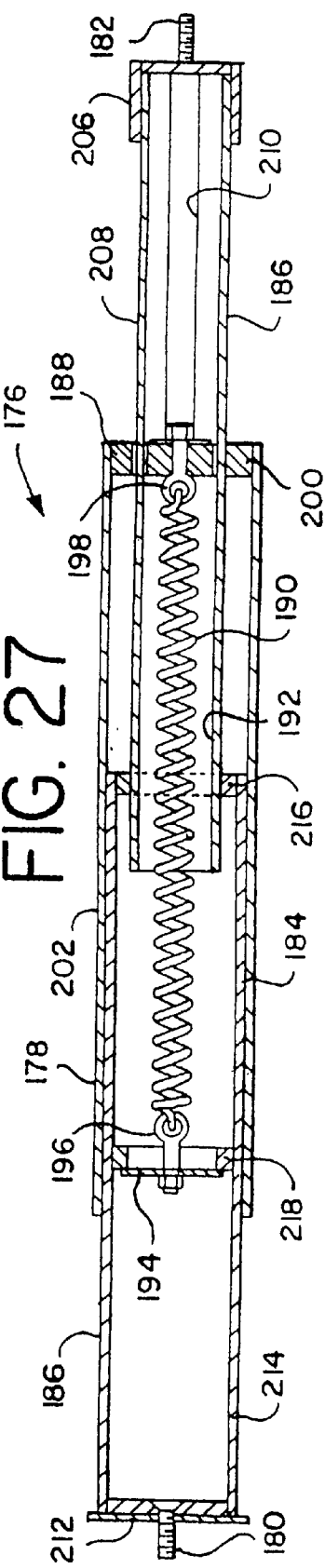

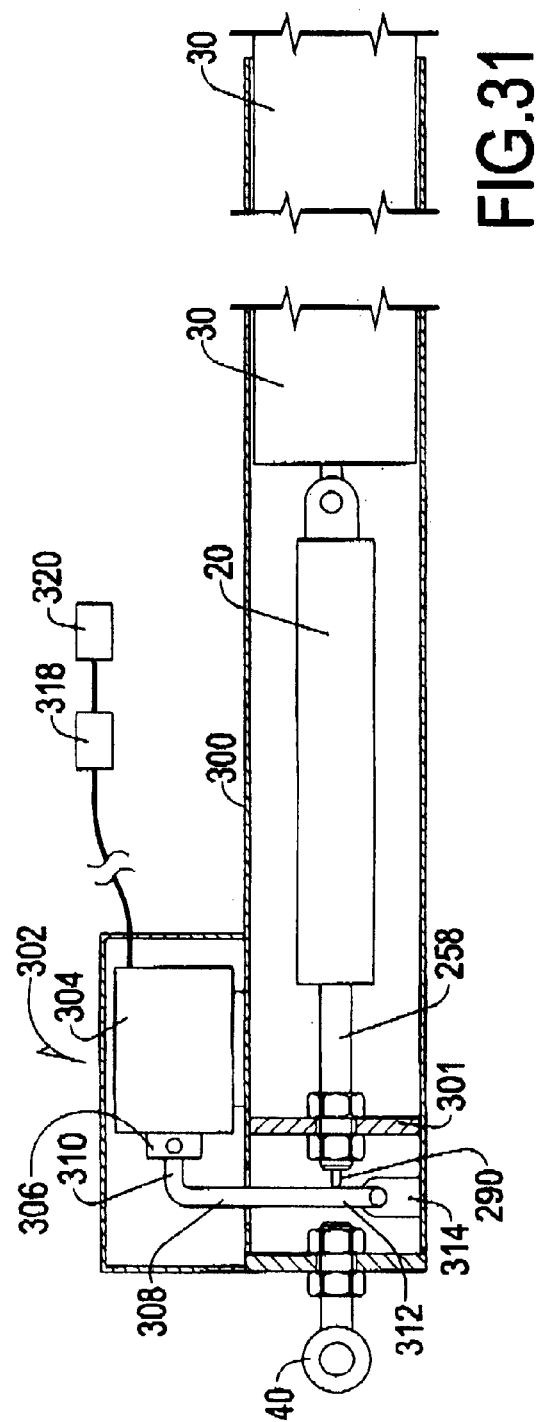
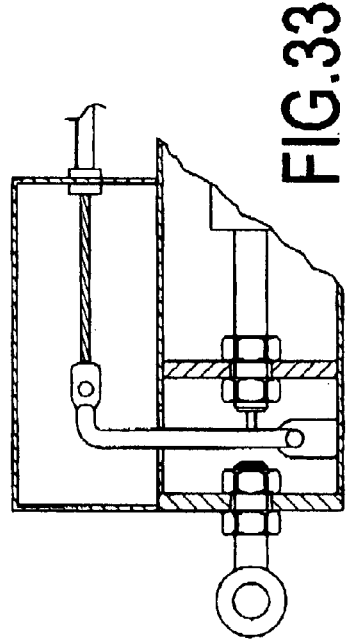
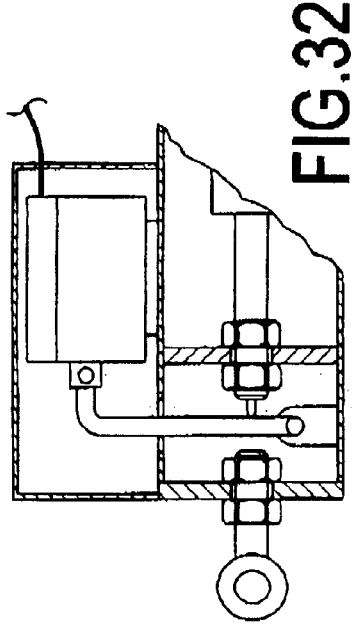

DYNAMICALLY ADJUSTABLE MOTION STABILIZER

BACKGROUND OF THE INVENTION

1. Field of the Invention

The present invention relates to relative motion stabilizers, and more particularly to devices including one or more biasing elements and telescoping body assemblies for yieldingly holding a load in a quasi-normal or quasi-centered position.

2. Discussion of the Related Art

There is a long standing need for a stabilizer for stabilizing the movement of a load that is movable relative to another load or a relatively fixed support. Such a stabilizer should yieldingly hold the load in a normal position. In many instances, the normal position is a centered position in a range of movement of the movable load. The stabilizer should include a reaction unit having a biasing element acting through an assembly to permit the load to be displaced from the normal position and to resiliently bias the load to return from the displaced position back toward the normal position.

There are numerous and varied applications for a motion stabilizer of this kind. One example of an application exhibiting such a need is the steering system of a large vehicle such as a truck or recreational vehicle. In this application, the motion stabilizer urges the steering gear toward a normal or centered position in which the vehicle travels straight ahead and permits the steering gear to be displaced so that the vehicle can be turned. In a vehicle application, a motion stabilizer should be able to hold the vehicle under control in the presence of cross winds, road irregularities, tire blowouts, and the like. Other applications for motion stabilizers include conveyors and manufacturing equipment, power boats, vehicles of many types and trailer hitch systems. A motion stabilizer can provide advantages in many situations where a movable load must be yieldingly held in a centered or normal position.

Many stabilizing or centering systems have been developed or proposed in the past. For example, U.S. Pat. Nos. 1,223,573 and 4,406,473 disclose vehicle steering stabilizer systems using a pair of coil springs urging a component of the vehicle steering linkage toward a centered or normal position. In another example, U.S. Pat. No. 4,822,012 discloses a bidirectional steering stabilizer having a single spring and a damper for yieldably biasing the wheels of a vehicle toward a straight ahead direction. Although these systems are relatively simple in that they are mechanical devices with relatively few parts, they suffer from disadvantages including interfering with the operator's ability to control the vehicle in a natural way and a lack of the ability to accommodate a variety of types of springs and reaction units and the ability to easily adjust the stabilizer to match the requirements of a particular vehicle or application.

Another approach that has been used in the past is to provide a complex hydraulic and pneumatic system for assisting the power steering system of a large vehicle in holding the steering linkage and wheels on center. One example of a system of this type is the Howard Power Center Steering System sold by River City Products, Inc. of San Antonio, Tex. Although this steering control system performs well, it is subject to the disadvantages of complexity and large expense, and it is not easily adaptable to a variety of differing applications.

One of the major shortcomings of prior art stabilizing and centering systems, particularly for applications involving vehicle steering stabilizer systems, is the inability to dynamically adjust the desired "centered" position of the steering stabilizer systems. For example, when a steering stabilizer system is being installed on a large truck or motorhome, the apparent centered position would be when the front wheels of the vehicle are turned such that they would appear to cause the vehicle to follow a straight path. However, experience has demonstrated that straight ahead as determined visually is not necessarily straight ahead under actual operating conditions of the vehicle. As a result, after a test drive, the steering stabilizer system may need to be arbitrarily adjusted in an attempt to more accurately guestimate the location of the true operational center for the steering stabilizer system.

As another example of the need for a dynamically adjustable steering stabilizer system, if a heavy load is shifted more toward one side of a moving vehicle, or if one or more tires is not properly inflated on one side of the moving vehicle, or if a tire goes flat or blows out, or if the moving vehicle is being subjected to a severe cross-wind, the vehicle will tend to veer toward one side forcing the driver of the vehicle to counter-steer to compensate for the imbalance. In other words, under the changed conditions, the centering position originally perceived for the steering stabilizer system has been displaced, at least temporarily. As a result, the steering stabilizer system which was intended to assist the driver has become a detriment to the driver and instead of assisting, in some cases works against, the driver while he is attempting to navigate the vehicle straight forwardly along the roadway.

What is needed is a steering stabilizer system wherein the centering and stabilizing characteristic thereof can be dynamically altered if necessary to compensate for changed or changing conditions, even as the vehicle is actually being driven along a roadway.

PRINCIPAL OBJECTS AND ADVANTAGES OF THE INVENTION

The principal objects of the invention include: providing an apparatus and method that provides an adjustable motion stabilizer for a vehicle; providing such an apparatus and method that can be dynamically adjustable while the vehicle is being operated; and generally providing such an apparatus and method that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

A principal object of the present invention is to provide an improved motion stabilizer for controlling relative movement of two relatively movable loads. Other objects are to provide a motion stabilizer including a biasing element and a telescoping body assembly for yieldingly urging a load member toward a normal or centered position; to provide a motion stabilizer that can extend the utility of a reaction unit such as a gas spring by doubling its effective stroke and providing a two-way action; to provide a motion stabilizer that can accommodate many types of reaction units such as compression or extension springs of several types, dampers and combinations of springs and dampers; to provide a motion stabilizer that can be tailored to optimize the operating characteristics required for many different applications such as vehicle steering systems and industrial applications; to provide a motion stabilizer that is bidirectional and symmetrical in operation; and to provide a motion stabilizer overcoming disadvantages of motion stabilizing and centering systems used in the past.

In brief, in accordance with the invention, there is provided a motion stabilizer for controlling motion between first and second relatively movable load members. The motion stabilizer includes an elongated body assembly defining an axially extending internal chamber. The body assembly includes axially spaced first and second attachment members for connection to the load members. A reaction unit is captured within the chamber and has an axial length that varies between first and second lengths. The body assembly has an axial length variable in response to relative motion of the attachment members. The body assembly has a normal position in which the reaction unit has the first length and in which the attachment structures are separated by a predetermined distance. The body assembly includes means for varying the axial length of the reaction unit from the first length toward the second length in response to relative axial movement of the attachment structures in either axial direction from the normal position. The body assembly includes at least a radially inner body member and a radially outer telescoped body member, the body members being axially movable relative to one another. The radially inner body member defines at least part of the chamber and has a force transfer portion engageable with the reaction unit. The inner body member includes an elongated axial opening providing access from the chamber to the radially outer body member. The reaction unit includes a force transfer portion extending radially from the chamber through the axial opening for engagement with the radially outer body member.

In addition, the motion stabilizer includes a centering adjustment mechanism to compensate for changed conditions that force a driver apply a counter-steering force to overcome undesirable or uncontrollable adverse steering conditions. The centering mechanism includes a gas-spring assembly for adjusting the "center" of the motion stabilizer, a locking mechanism for releasably locking the gas-spring assembly, a releasing mechanism for unlocking the locking mechanism, and a control mechanism for dynamically controlling the releasing mechanism.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 is a schematic illustration of a dynamically adjustable motion stabilizer constructed in accordance with the present invention used to control the relative motion of a pair of load members;

FIG. 2 is a simplified and partly schematic illustration of the motion stabilizer of FIG. 1 in its normal or centered position:

FIG. 3 is a view similar to FIG. 2 showing the motion stabilizer of FIG. 2 in an extended position;

FIG. 4 is a view similar to FIG. 2 showing the motion stabilizer of FIG. 2 in a retracted position;

FIG. 10 is an axial sectional view of a motion stabilizer constructed in accordance with the invention and corresponding to the simplified and partly schematic illustration of FIG. 2;

FIG. 11 is a view similar to FIG. 10 showing the motion stabilizer of FIG. 10 in an extended position;

FIG. 12 is a view similar to FIG. 10 showing the motion stabilizer of FIG. 10 in a retracted position;

FIG. 13 is a fragmentary sectional view similar to the left hand portion of FIG. 10 illustrating an alternative form of the motion stabilizer of FIGS. 10–12 wherein preload or slack is adjustable;

FIG. 14 is an enlarged axial sectional view showing the reaction unit of the motion stabilizer of FIGS. 10–12;

FIG. 15 is an end view of the reaction unit of FIG. 14;

FIG. 16 is an enlarged axial sectional view showing the outside body of the motion stabilizer of FIGS. 10–12;

FIG. 17 is an enlarged axial sectional view showing the inside body of the motion stabilizer of FIGS. 10–12;

FIG. 18 is an end view of the inside body of FIG. 17;

FIG. 19 is an enlarged side view showing the inner force transfer body of the motion stabilizer of FIGS. 10–12;

FIG. 20 is an end view of the right end of the inner force transfer body of FIG. 19;

FIG. 21 is an end view of the left end of the inner force transfer body of FIG. 19;

FIG. 22 is a further enlarged elevational view of a bar retaining clip of the force transfer body of FIG. 19;

FIG. 23 is an elevational view of a force transfer bar of the force transfer body of FIG. 19;

FIG. 24 is an end view of the force transfer bar of FIG. 23;

FIG. 25 is an axial sectional view of an alternative motion stabilizer constructed in accordance with the invention;

FIG. 26 is a view similar to FIG. 25 showing the motion stabilizer of FIG. 25 in a retracted position;

FIG. 27 is a view similar to FIG. 25 showing the motion stabilizer of FIG. 25 in an extended position;

FIG. 28 is an elevational view of a force transfer disc of the motion stabilizer of FIGS. 25–27;

FIG. 31 is a fragmentary view of the centering adjustment mechanism of the motion stabilizer, showing a releasing mechanism and a controlling mechanism thereof in accordance with the present invention;

FIG. 32 is a fragmentary view of the centering adjustment mechanism of the motion stabilizer, showing a variation of FIG. 31.

FIG. 33 is a fragmentary view of the centering adjustment mechanism of the motion stabilizer, showing another variation of FIG. 31.

DETAILED DESCRIPTION OF THE PREFERRED EMBODIMENTS

Figure 5:
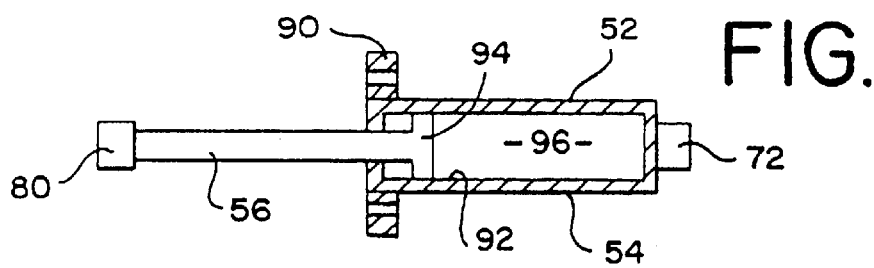
FIG. 5 is a simplified schematic illustration of the reaction unit of the motion stabilizer of FIGS. 1–4 wherein the reaction unit includes a gas spring.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a dynamically adjustable motion stabilizer in accordance with the present invention, as shown in FIGS. 1 through 28. The dynamically adjustable motion stabilizer 10 includes a motion stabilizer, as shown in FIGS. 1 through 27 and as described immediately hereinbelow and as described in U.S. Pat. No. 6,237,904, issued May 29, 2001 to John D. Shepherd. The dynamically adjustable motion stabilizer 10 also includes a centering adjustment mechanism 20, as shown in FIGS. 1 and 29 through 31 as described hereinbelow, following the description of the motion stabilizer. The centering adjustment mechanism 20 is not shown in FIGS. 2 through 28 for simplification purposes.

FIG. 1 of the drawings illustrates a motion stabilizer 30 constructed in accordance with the present invention used for controlling the relative motion of first and second load members 32 and 34. As shown in FIG. 1, the load members 32 and 34 are in a normal or centered position. As indicated by the arrow 36, the load 32 is movable away from the normal position relative to the load 34, either toward or away from the load 34. This movement either decreases or increases the distance between the loads 32 and 34. The motion stabilizer 30 includes an elongated, telescoped body 38 and a pair of attachment members 40 and 42 for attaching the motion stabilizer 30 to the loads 32 and 34. The motion stabilizer 30 is capable of shortening or lengthening as the loads 32 and 34 move relative to one another and the motion stabilizer 30 in accordance with the invention applies a force to the loads 32 and 34 tending to yieldingly return the loads 32, 34 to their normal position as illustrated in FIG. 1.

The principal functional components of the motion stabilizer 30 are shown in simplified, schematic fashion in FIGS. 2–4. The body 38 includes an outside body 44 carrying the attachment member 40 and an inside body 46 carrying the attachment member 42. Within the outside body 44 and partly surrounding the inside body 46 is an inner force transfer body 48. An elongated, axially extending internal chamber 50 is defined within the body 38. The chamber 50 is unobstructed and is coaxial with the body 38.

A reaction unit 52 is supported within the chamber 50. The reaction unit 52 includes a housing 54 and a projecting stem 56 and, in a preferred embodiment of the invention, a spring within the housing 54 biases the stem 56 to a normal, extended position shown in FIG. 2. The axial length of the reaction unit 52 can be changed if a force applied between the housing 54 and stem 56 retracts the stem 56 into the housing 54 (FIG. 3 or 4) and in this case the spring within the housing 54 urges the stem 56 back to the normal position.

The outside, inside and force transfer bodies 44, 46 and 48 are telescoped together for axial sliding movement. The outside body 44 includes an end wall 58 carrying the attachment member 40 and an axially extending tubular side wall 60 having an inwardly enlarged portion 62 and a collar portion 64. The end of the enlarged portion 62 opposite the collar 64 defines a drive shoulder 66.

The inside body 46 includes an end wall 68 carrying the attachment member 42 and an axially extending spacer segment 70. Spacer segment 70 can contact a bumper 72 carried by the reaction unit housing 54. A tubular side wall 74 extends axially from the spacer segment 70 through an opening in the collar portion 64 of the outside body 44. The end of the side wall 74 terminates in a radially outwardly extending collar 76 that is slidably received within the enlarged portion 62 of the outside body 44.

The inner force transfer body 48 is located within the outside body 44 and includes an end wall 78 that can abut against the end wall 58 of the outside body 44. The end wall 78 can also contact a bumper 80 carried by the stem 56 of the reaction unit 52. A side wall 82 of the force transfer body 48 is defined by axially extending body portions 84 defining a pair of elongated axially extending openings 86 communicating with the internal chamber 50. The end of the side wall 82 terminates in a collar 88 that overlies the collar 76 of the inside body 46. The side wall 82 of the force transfer body 48 is axially slidable within the enlarged portion 62 of the outside body 44. The collar 76 of the inside body 46 is apertured to slidably receive the body portions 84 of the force transfer body 48.

The outside, inside and force transfer bodies 44, 46 and 48 are slidably related to permit the axial length of the motion stabilizer 30 to increase when the loads 32 and 34 move apart and to decrease when the loads 32 and 34 move toward each other. When the attachment members 40 and 42 move apart (compare FIG. 2 with FIG. 3), the side wall 74 of the inside body 46 slides within the collar 64 of the outside body 44, the collar 76 of the inside body 46 slides within the enlarged portion 62 of the outside body 44, and the collar 76 of the inside body 46 contacts the collar 88 of the force transfer body 48 causing the force transfer body 48 to move together with the inside body 46 as the side wall 82 of the force transfer body 48 slides within the enlarged portion 62 of the outside body 44. When the attachment members 40 and 42 move toward one another (compare FIGS. 2 and 4), the side wall 74 of the inside body 46 slides within the collar 64 of the outside body 44, and the collar 76 slides along the axially extending openings 86 defined between the body portions 84 of the force transfer body 48.

The housing 54 of the reaction unit 52 includes a radially outwardly extending portion 90 that extends from the internal chamber 50 through the axially extending openings 86 of the inner force transfer body 48 to the outside body 44 where it can contact the drive shoulder 66 of the outside body 44. The portion 90 is axially slidable relative to the force transfer body 48 and can be contacted by the collar 76 of the inside body 46.

In operation of the motion stabilizer 30 as shown in FIGS. 1–4, a normal position is shown in FIG. 2. The normal position may also be referred to as a centered position in those applications where the normal position is at the center of a range of relative movement of the loads 32 and 34. In the normal position of FIG. 2, the stem 56 is extended, the bumper 72 contacts the end of the spacer segment 70 of the inside body 46, the bumper 80 contacts the end wall 78 of the force transfer body 48, and the end wall 78 of the force transfer body 48 contacts the end wall 58 of the outside body 44. In the illustrated normal position, there is no space between these contacting elements and there is no slack in the normal position. If a zone of free motion or slack is desired around the normal or centered position, then space is introduced, for example adjacent the bumpers 72 and 80.

The reaction unit 52 may be in its fully extended condition (against a hard internal stop for example) in the normal position shown in FIG. 2. If a preloaded condition is desired, the parts are positioned and sized so that in the extended condition of FIG. 2, the stem 56 is not fully extended relative to the reaction unit housing 54. In this case, the initial force required to move the stem 56 is increased. The force characteristics may also be varied by choice of material of one or both of the bumpers 72 and 80. A rigid metal may be used to provide a stiff or hard effect while a soft elastomeric material may be used to provide a softer action.

When the loads 32 and 34 move apart from the normal position, the motion stabilizer 30 becomes longer and, when the loads 32 and 34 move toward one another from the normal position, the motion stabilizer 30 becomes shorter. In either case, when the length of the motion stabilizer 30 either increases or decreases, the body 28 acts to move the stem 56 of the reaction unit 52 from its extended position and into the housing 54 thereby to shorten the axial length of the reaction unit 52.

More specifically, when the axial length of the motion stabilizer 30 increases (compare FIGS. 2 and 3), the drive shoulder 66 of the outer housing 44 engages and applies a force to the radially outwardly extending portion 90 of the housing 54 of the reaction unit 52. Simultaneously, the collar 76 of the inside body 46 engages the collar 88 of the force transfer body 48, and the end wall 78 of the force transfer body 48 engages and applies an equal and opposite force to the bumper 80 carried by the stem 56 of the reaction unit 52. As a result the stem 56 is forced into the housing 54. In a preferred arrangement, the result is that compression of a spring within the housing 54 results in an increasing force that urges the stem 56 outward, back toward its extended position.

When the axial length of the motion stabilizer 30 decreases (compare FIGS. 2 and 4), the end wall 58 of the outer housing 44 acts through the end wall 78 of the force transfer body 48 and applies a force to the bumper 80 carried by the stem 56 of the reaction unit 52. Simultaneously, the spacer portion 70 of the inside body 46 applies an equal and opposite force to the bumper 72 carried by the housing 54 of the reaction unit 52. As a result, the stem 56 is forced into the housing 54. In a preferred arrangement, the result is that compression of a spring within the housing 54 results in an increasing force that urges the stem 56 outward, back toward its extended position.

The reaction unit 52 is compressed or axially shortened from its normal axial length when the length of the motion stabilizer 30 either increases or decreases from its normal or centered length. The working stroke of the reaction unit 52 is in effect doubled because its stroke is used to provide a return force in a bilateral fashion. This stroke-doubling effect is useful in applications where a load can move in two directions from a normal or centered position.

A preferred gas spring reaction unit 52 is shown in simplified form in FIG. 5. The housing 54 defines a cylinder 92 and the stem 56 carries a piston 94 movable in the cylinder 92. A compressible gas such as nitrogen is trapped within a region 96. When the stem 56 is forced into the housing 54, the volume of region 96 is decreased and gas is compressed in the region 96. The energy stored in the compressed gas applies a reactive return force biasing the stem 56 back to its extended position. Gas springs operating in this fashion are known, and examples useful for vehicle steering systems as well as other applications are identified in U.S. Pat. No. 6,126,754, incorporated herein by reference.

Figure 6:
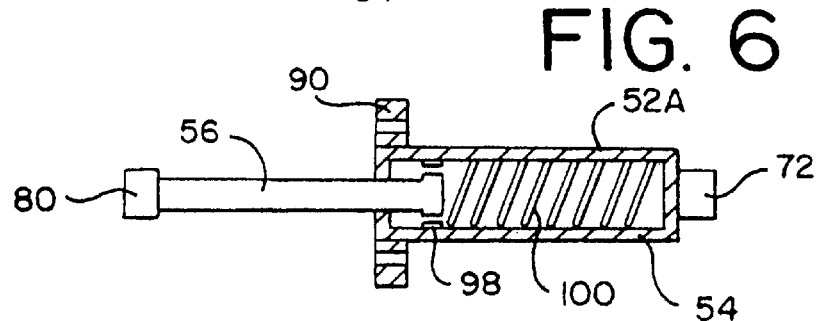
FIG. 6 is a simplified schematic illustration of an alternative reaction unit of the motion stabilizer wherein the reaction unit includes a coil spring.

As illustrated in FIGS. 6–9, the present invention can employ many different types of reaction units. FIG. 6 shows a compression spring reaction unit 52A. Stem 56 terminates in a head 98 slidable within the housing 54. A compression coil spring 100 is positioned between the head 98 and the closed end of the housing 54. When the stem 56 is forced into the housing 54, the coil spring 100 is compressed and the energy stored in the compressed spring 100 applies a reactive return force biasing the stem 56 back to its extended position.

Figure 7:
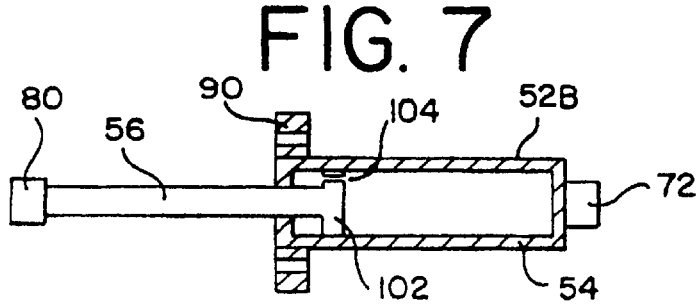
FIG. 7 is a simplified schematic illustration of an alternative reaction unit of the motion stabilizer wherein the reaction unit includes a damper.

FIG. 7 shows a damping reaction unit 52B. Stem 56 terminates in a piston 102 having a restricted orifice 104. The housing 54 is filled with a fluid such as air or other gas or a suitable liquid or mixture of liquid and gas. When the piston 102 moves within the housing 54, the motion is resisted by restricted flow through the orifice 104, thus damping axial motion of the stem 56 in the housing 54. When the motion stabilizer 30 is supplied with the damping reaction unit 52B, the motion stabilizer 30 does not provide a reactive force tending to return the loads 32 and 34 to their normal position. Instead, in this application, the motion stabilizer 30 provides a reactive controlled damping force, and this force is applied over a range of movement that is effectively twice the range of movement of the cylinder 92 and damping piston 102 alone.

Figure 8:
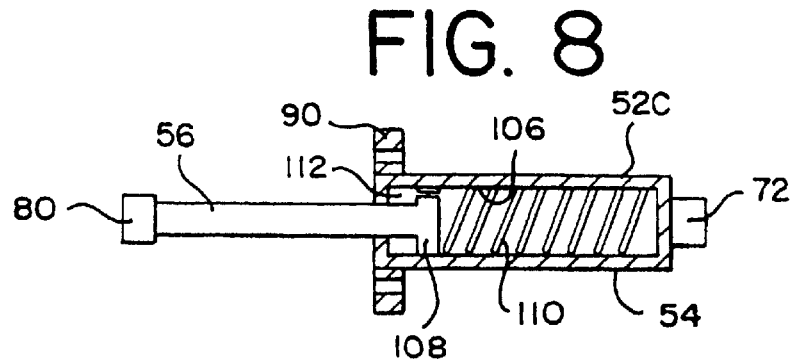
FIG. 8 is a simplified schematic illustration of an alternative reaction unit of the motion stabilizer wherein the reaction unit includes a coil spring and a damper.

FIG. 8 shows a reaction unit 52C combining spring and damping actions. The housing 54 defines a cylinder 106 that is filled with a suitable damping fluid. The stem 56 terminates in a piston 108 axially movable in the cylinder 106. A coil spring 110 is interposed between the piston 108 and the opposed end wall of the body 54. A restricted orifice 112 is formed in the piston 108. When the stem 56 is forced into the housing 54, the coil spring 110 is compressed and the energy stored in the compressed spring 110 applies a reactive return force biasing the stem 56 back to its extended position. Simultaneously, the motion of the piston 108 and stem 56 relative to the housing 54 is damped by the restricted flow of fluid through the orifice 112.

There are many known devices that provide a combination of spring and damping reactive forces and that can be used as reaction units in a motion stabilizer in accordance with the present invention. For example, gas springs having both gas spring characteristics and damping characteristics are available from companies including Industrial Gas Springs Inc. of Newtown Square, Pa. Shock absorber assemblies having both spring and damping characteristics are available from companies including Gabriel Ride Control Products, Inc., 100 Westwood Place, Brentwood, Tenn. 37027. An advantage of the motion stabilizer of the present invention is that the unobstructed cylindrical elongated internal chamber such as the chamber 50 of the motion stabilizer 30 can accommodate these and other available devices that can serve as reaction units with little or no modification. This adds to the versatility of motion stabilizers incorporating features of the present invention and augments their ability to be matched or tailored to the requirements of many different applications.

Figure 9:
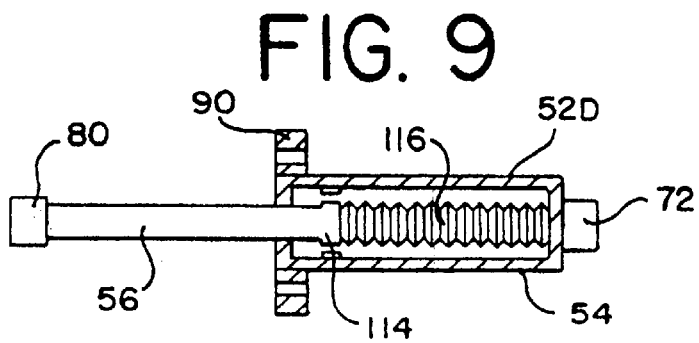
FIG. 9 is a simplified schematic illustration of an alternative reaction unit of the motion stabilizer wherein the reaction unit includes an elastomeric spring.

FIG. 9 shows an elastomeric spring reaction unit 52D. Stem 56 terminates in a head 114 slidable within the housing 54. A compressible elastomeric body 116 of rubber or similar material is positioned between the head 114 and the closed end of the housing 54. When the stem 56 is forced into the housing 54, the body 116 is compressed and the energy stored in the compressed body 116 applies a reactive return force biasing the stem 56 back to its extended position. As will appear below in connection with FIGS. 26–28, expansion springs as well as compression springs can be used in reaction units for motion stabilizers of the present invention. Elastomeric springs, having characteristics like rubber bands, are suitable for such applications.

FIGS. 10–12 illustrate a preferred motion stabilizer 120 that can be constructed as a practical embodiment of the invention shown in schematic and simplified form in FIGS. 1–4. FIG. 10 illustrates the normal or centered position shown in FIG. 2, FIG. 11 illustrates the extended position shown in FIG. 3, and FIG. 12 illustrates the retracted position shown in FIG. 4. Because the motion stabilizers 30 and 120 are the same except for the level of detail illustrated and because both operate in the same manner, the same reference characters are used for corresponding elements, and the description of the elements and their operation is not repeated.

FIGS. 14–24 illustrate details of construction of the motion stabilizer 120. The reaction unit 52 is shown in FIGS. 14 and 15. A conventional gas spring assembly 122 includes an elongated cylindrical body 124 from which the stem 56 extends. For example the gas spring assembly 122 may be a 150-pound spring force Model No. 101-6-14-72-T-150 or a 270-pound spring force Model No. 101-6-14-72-T-270 available from Industrial Gas Springs, Inc. of 4615 West Chester Pike, Newtown Square, Pa. The body 124 is received in a container tube 126 having an end cap 128 supporting the bumper 72. The radially outwardly extending portion 90 is a disk 130 secured to the open end of the tube 126. The disk 130 includes an opposed pair of arcuate apertures 132 for slideably receiving the axially extending body portions 84 of the inner force transfer body 48.

FIG. 16 illustrates details of construction of the outside body 44. The side wall 74 is formed by a tube 134. The inwardly enlarged portion is a tube 136 secured within the tube 134 and the end of the tube 136 forms the drive shoulder 66. A cap 138 is threaded onto the end of the tube 134 to provide the collar 64. O-ring seals 140 provide a sliding seal between the cap 138 and the side wall 74 of the inside body 46 to exclude dirt and contaminants from the interior of the motion stabilizer 120. Another cap 142 is threaded onto the opposite end of the tube 134 to form the end wall 58. The attachment member 40 is a threaded shank of a screw held to the cap 142 by a nut 144.

FIGS. 17 and 18 illustrate details of construction of the inside body 46. The side wall 74 is formed by a tube 146 having a closed end 148. Spacer segment 70 is a tube 150 closed at both ends, and an added spacer disk 152 is interposed between the end of tube 150 and the closed end 148 of tube 146. Attachment member 42 is the threaded shank of a screw held to the closed end 148 by a nut 154. The radially outwardly extending collar 76 is provided by two arcuate flange portions 156. The collar 76 is interrupted by two arcuate gaps 158 (FIG. 18) that slidably receive the axially extending body portions 84 of the inner force transfer body 48.

FIGS. 19–24 illustrate details of construction of the inner force transfer body 48. The axially extending body portions 84 are force transfer bars, one of which is shown in FIGS. 23 and 24. The bar 84 has an arcuate shape (FIG. 24) and one end of the bar 84 includes a tab portion 160 with an aperture 162. The ends of the bars 84 opposite the tabs 160 are secured to a pair of chord members 164 cooperating with the bar ends to form the collar 88. The end wall 68 is provided by a disc having holes receiving the tabs 160. The tabs are secured by keepers 166 (FIG. 22) held in place by spring retention clips 168.

Supplementing the description of the operation of the motion stabilizer 120, the inner force transfer body 48 slides within the outside body 44. The bars 84 slidably extend through the apertures 132 (FIG. 15) to permit movement of the inner force transfer assembly 48 relative to the reaction unit 52 (compare FIGS. 10 and 11). The bars 84 slidably extend through the gaps 158 (FIG. 18) in the collar 76 of the inside body 46, and the collar 76 abuts the collar 88 of the inner force transfer body 48 to permit the inside body 46 to act through the inner force transfer body 48 and retract the reaction unit 52 as the motion stabilizer 120 extends in length from the normal position of FIG. 10 to the extended position of FIG. 11. Simultaneously, the disk 130 extends radially out through the axially extending openings 86 defined between the bars 84 to engage the drive shoulder 66 of the tube 136. Sliding motion of the bars 84 through the apertures 132 in the disk 132 and through the gaps 158 in the collar 76 permit the motion stabilizer 120 to move from the normal position of FIG. 10 to the retracted position of FIG. 12.

FIG. 13 illustrates an alternative construction of the motion stabilizer 120 wherein slack or preload is adjustable. In this arrangement, a spacer ring 170 is secured to the inside of the end cap 142 to provide clearance. An adjustment screw 172 extends through the end wall disk 78. The screw 172 can be threaded in or out to adjust the spacing between the disk end wall 78 and the bumper 80. For example, the screw 172 may be withdrawn to provide a gap between the end of the screw mechanism and the bumper 80. In this case, the gap permits a small range of free motion or slack around the normal or centered position. Alternatively, the screw 172 may be extended to force the stem 56 into the housing 54 of the reaction unit 52. This provides a preload and the initial reactive force is increased as the reaction unit 52 is moved from the normal or centered position.

Another embodiment of the invention using an expansion spring is shown in FIGS. 25–28. A motion stabilizer 176 includes a body 178 having attachment members 180 and 181 at opposed ends for attachment to relatively movable loads. An outside body 184 is axially slidable relative to an inner body 186 in order to vary the length of the motion stabilizer 176, either shortening it (FIG. 26) or lengthening it (FIG. 27) relative to a normal or centered position (FIG. 25). A reaction unit 188 including a coil extension spring 190 is contained within an internal chamber 192 defined within the body 178. When the body 178 is either lengthened or shortened by relative motion of loads attached to the members 180 and 182, the telescoping components of the body 178 act to stretch the coil extension spring 190, thereby producing a reaction force urging the body 178 to return to its normal or centered position.

The reaction unit 188 includes an end plate 194 supporting an eye bolt 196 connected to one end of the extension spring 190. The other end of the extension spring 190 is connected to an eye bolt 198 carried by a radially outwardly extending disk member 200. An outer sealing tube 202 is secured to the outer periphery of the disk member 200. The disk member 200 is provided with arcuate openings 204 (FIG. 28) to permit sliding motion of the inner body 186.

The inner body 186 includes an end cap 206 secured to a tube 208 serving as a side wall of the inner body 186. The attachment member 182 takes the form of a screw threaded through the end cap 206. Elongated axially extending openings 210 are formed in the tube 208. The axially extending portions of the tube 208 between the openings 210 are slidably received in the arcuate openings 204, and the portions of the disk 200 between the arcuate openings 204 extend radially outward through the axially extending openings 210.

The outside body 184 includes an end cap 212 carrying the attachment member 180 in the form of a screw. The end cap 212 is threaded into the end of a tube 214 forming a side wall of the outside body 184. The opposite end of the tube 214 is provided with an internal collar 216 that slidably receives the side wall tube 208 of the inner body 186. A drive collar 218 is secured intermediate the ends of the side wall tube 214 of the outside body 184.

In the normal or centered position of the motion stabilizer 176 shown in FIG. 25, the extension spring 190 is retracted, and preferably is in tension to provide an initial preload. The end plate 194 contacts the drive collar 218 and the open end of the outer sealing tube 202 contacts the end cap 212 of the outside body 184. These points of contact of the reaction unit 188 with the outside body 184 establish the normal or centered position of the motion stabilizer 176.

When the motion stabilizer 176 is shortened from the normal position of FIG. 25 toward the retracted position of FIG. 26, the end of the side wall tube 208 applies a force to the end plate 194 of the reaction unit 188. Simultaneously the end cap 212 of the outside body 184 applies an equal and opposite force to the end of the outer sealing tube 202 of the reaction unit 188. This force is transmitted through the disk 200 which extends radially outward through the axially extending openings 210 in the side wall tube 208 of the inner body 186. As a result, the extension spring 190 is extended and the force stored in the extension spring 190 applies a reactive force tending to return the motion stabilizer 176 to the normal position.

When the motion stabilizer 176 is lengthened from the normal position of FIG. 25 toward the extended position of FIG. 27 the drive collar 218 of the outside body 184 applies a force to the end plate 194 of the reaction unit 188. Simultaneously, the portions of the side wall tube 208 at the ends of the axially extending openings 210 apply an equal and opposite force to the radially outwardly extending disk 200 of the reaction unit 188. As a result, the extension spring 190 is extended and the force stored in the extension spring 196 applies a reactive force tending to return the motion stabilizer 176 to the normal or centered position.

Other spring types, such as a gas spring, could be used in the compression type reaction unit 188 of the motion stabilizer 176. In addition damping could be used to augment or used in place of the compression or tension-type spring.

A reactive force is provided by spring extension whether the motion stabilizer 176 extends or retracts from the normal or centered position. The stroke of the reaction unit 188 is effectively doubled because the range of motion is effective twice the stroke of the reaction unit alone. The unobstructed internal chamber permits the use of a variety of reaction units having characteristics matched to many different applications.

The centering adjustment mechanism 20 may be positioned between load 32 and the outside body 44 as indicated in FIG. 1. Alternatively, the centering adjustment mechanism 20 may be positioned between load 34 and the inside body 46 as indicated in phantom in FIG. 1 and designated by the numeral 22.

Figure 29:
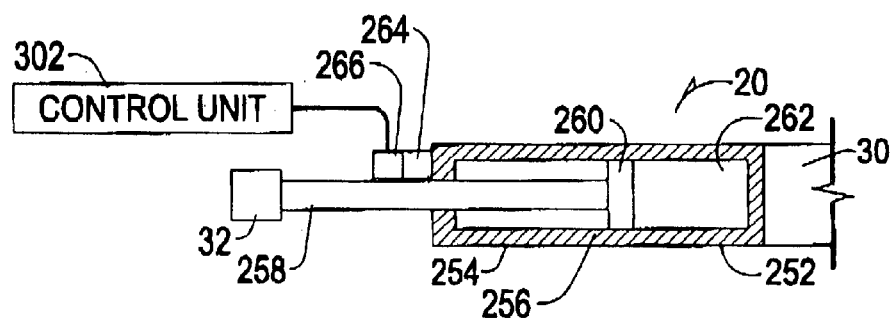
FIG. 29 is a simplified schematic illustration of the centering adjustment mechanism of the motion stabilizer of FIG. 1.

Preferably, the centering adjustment mechanism 20 includes a gas spring unit 252 as shown schematically in FIG. 29. A housing 254 defines a cylinder 256 and a stem 258 carries a piston 260 movable in the cylinder 256. A compressible gas such as nitrogen is trapped within a region 262. When the stem 258 is forced into the housing 254, the volume of region 262 is decreased and gas is compressed in the region 262. The energy stored in the compressed gas applies a reactive return force biasing the stem 258 back toward its extended position. The centering adjustment mechanism 20 also includes a locking mechanism 264 structured to lock the stem 258 at a desired position relative to the housing 254, and a releasing mechanism 266 structured to control the locking mechanism 264.

Figure 30:
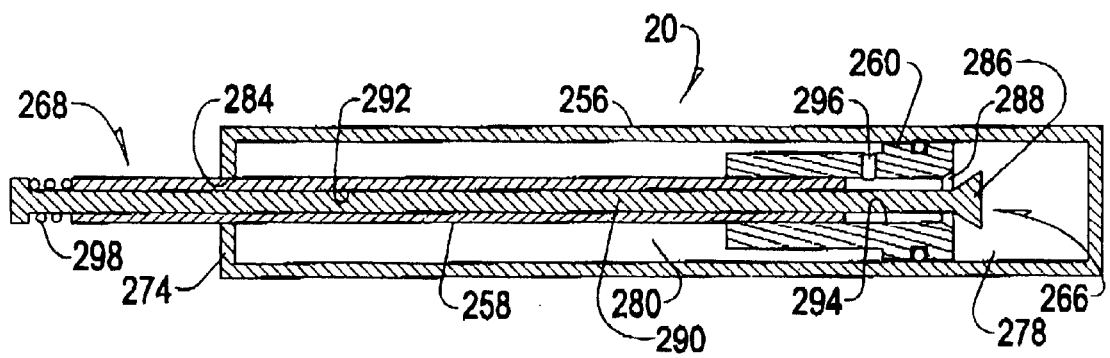
FIG. 30 is a fragmentary, axial sectional view of a centering adjustment mechanism of the motion stabilizer, constructed in accordance with the invention and corresponding to the simplified schematic illustration of FIG. 29.

FIG. 30 illustrates details of construction of the centering adjustment mechanism 20 as described below. The centering adjustment mechanism 20 includes a gas spring assembly 268, the cylinder 256 including a first end wall 272, a second end wall 274, and the piston 260 that separates a first chamber 278 from a second chamber 280. The first chamber 278 and second chamber are filled with a high pressure medium, such as nitrogen or other suitable fluid. The stem 258 extends from the piston 260 to and through an orifice 284 in the second end wall 274. The stem 258 and orifice 284 are dimensioned to cooperatively allow the stem 258 to be displaced longitudinally relative to the orifice 284 while retaining the high pressure medium in the second chamber 280.

The locking mechanism 264 of the centering adjustment mechanism 20 includes a valve head 286 which sealingly engages a valve seat 288 to prevent and control transfer of the high pressure medium between the first chamber 278 and second chamber 280 to thereby lock the piston 260 in place relative to the cylinder 256.

The releasing mechanism 266 of the centering adjustment mechanism 20 includes a pushrod 290 connected to the valve head 286 and extending through a bore 292 defined axially lengthwise through the stem 258. The pushrod 290 and bore 292 are dimensioned to cooperatively allow the pushrod 290 to be displaced longitudinally relative to the bore 292 while preventing the high pressure medium from escaping from the cylinder 256. The releasing mechanism 266 also includes a partial bore 294 that is in fluid communication with the first chamber 278 when the valve head 286 is not in sealing engagement with the valve seat 288. In addition, the releasing mechanism 266 includes a cross-bore 296 that connects the partial bore 294 in fluid communication with the second chamber 280. A resilient means such as a spring 298, sometimes referred to herein as a sealing spring, or other suitable means, biases the valve head 286 into sealing engagement with the valve seat 288. A locking gas-spring device, somewhat similar to the combination of the gas spring assembly 268, the locking mechanism 264, and the releasing mechanism 266 as aforedescribed, is the BLOC-O-LIFT device provided by Stabilus GmbH, of Germany.

In a preferred embodiment, the centering adjustment mechanism 20 is securely connected to the motion stabilizer 30 as indicated in FIG. 31. An outer cover 300, surrounding and securely connected to the centering mechanism 20, provides a platform for mounting the attachment member 40. The stem 258 is securely connected to the outer cover 300 by bracket 301 as shown in FIG. 31. The outer cover 300 extends to slidingly telescope about the outside body 44 of the motion stabilizer 30, as shown in FIG. 31. A control mechanism 302 of the centering adjustment mechanism 20 includes an activation mechanism, such as a solenoid 304 having a plunger 306 that is drawn inwardly when the solenoid 304 is activated and automatically returns to a non-activated position when the solenoid 304 is de-activated. The solenoid 304 is mounted on the outer cover 300. The control mechanism 302 includes a lever 308 having a proximal end 310 pivotally connected to the plunger 306 and a distal end 312 pivotally connected to a pivot bracket 314 mounted on a internal surface of the outer cover 300. The solenoid 304, lever 308, and pivot bracket 314 are dimensioned and spaced such that the lever 308 bears against the distal end of and longitudinally displaces the pushrod 290 when the solenoid 304 is activated to cause the valve head 286 to be spaced apart from the valve seat 288 to thereby allow the high pressure medium to flow freely between the first chamber 278 and the second chamber 280 to equalize the pressure in the two chambers, allowing the piston 260 to be displaced accordingly which, in turn, causes the stem 258, through bracket 301, to displace the outer cover 300 longitudinally and telescopically relative to the motion stabilizer 30 to thereby establish a new "centered" position of the centering adjustment mechanism 20. Then, when the solenoid 304 is deactivated, the plunger 306 returns to its extended configuration allowing the spring 298 to longitudinally displace the pushrod 290 to thereby cause the valve head 286 to again sealingly engage the valve seat 288. The centering adjustment mechanism 20 is thus locked in the newly established "centered" position.

The control mechanism 302 also includes electrical connections 316 connected through a switch mechanism 318, preferably easily accessible to the driver of the vehicle such as a hand switch mounted on the dash or a foot switch mounted on the floorboard, to a power source 320 such as the battery of the vehicle.

It is to be understood that a small, remotely controlled hydraulic cylinder, as shown in FIG. 32, can be used in place of the solenoid 304 to longitudinally displace the pushrod 290 to cause the valve head 286 to be spaced apart from the valve seat 288 to thereby allow the high pressure medium to flow freely between the first chamber 278 and the second chamber 280 to equalize the pressure in the two chambers, allowing the piston 260 to be displaced accordingly which, in turn, causes the stem 258, through bracket 301, to displace the outer cover 300 longitudinally and telescopically relative to the motion stabilizer 30 to thereby establish a new "centered" position of the centering adjustment mechanism 20. Additionally, a sheathed release cable, as shown in FIG. 33, can be appropriately attached to the proximal end 310 of the lever 308 to longitudinally displace the pushrod 290 as aforesaid. Other examples of structure that will suffice for the locking mechanism 264 and/or the releasing mechanism 266 will occur to those skilled in the pertinent art based on the disclosure herein.

In an application of the present invention, the centering adjustment mechanism 20 connects the motion stabilizer portion 30 to one of the relatively movable loads, 32 or 34, and the motion stabilizer portion 30 is connected to the other one of the relatively movable loads, 34 or 32, such that the centering adjustment mechanism 20 and the motion stabilizer portion 30 are effectively connected in tandem between the relatively movable loads, 32 and 34. Preferably, the dynamically adjustable motion stabilizer 10 is connected between the relatively movable loads 32 and 34 such that the magnitude of relative displacement of the loads 32 and 34 away from each other as permitted by the motion stabilizer portion 30 is approximately equal to the magnitude of relative displacement of the loads 32 and 34 toward each other permitted by the motion stabilizer portion 30. Such an arrangement generally maximizes the range of stabilization provided by the motion stabilizer portion 30.

In addition, the dynamically adjustable motion stabilizer 10 is preferably connected between the relatively movable loads, 32 and 34, such that the magnitude of adjustment available for lengthening the centering adjustment mechanism 20 is approximately equal to the magnitude of adjustment available for shortening the centering adjustment mechanism 20. Again, such an arrangement generally maximizes the range of adjustment provided by the centering adjustment mechanism 20. Generally, the range of movement allowable by the centering adjustment mechanism is approximately one inch. It is to be understood that some applications may require a range of movement greater than one inch.

As hereinbefore described, when a steering stabilizer system is being installed on a large truck or motorhome, the apparent centered position, even though the front wheels of the vehicle are turned such that they appear to point straight ahead, may not be exact but, instead, may operationally cause the vehicle to pull to one side, either to the left or to the right. For a vehicle utilizing the dynamically adjustable motion stabilizer 10 of the present invention, it is a simple matter for the user of the vehicle, while holding the steering wheel such that the vehicle follows a straight-ahead course, to cause the control mechanism 302 to activate the releasing mechanism 266, which in turn controls the locking mechanism 264. In so doing, the pressure of the high pressure medium is dynamically allowed to equalize in the first chamber 278 and second chamber 280 of the centering adjustment mechanism 20. Accordingly, the motion stabilizer portion 30, which is connected in tandem with the centering adjustment mechanism 20, establishes a new centered position. The user of the vehicle then causes the control mechanism 302 to allow the releasing mechanism 266 to deactivate thereby allowing the locking mechanism 264 to automatically lock the piston 276 in its new position relative to the cylinder 270. The dynamically adjustable motion stabilizer 10 then causes the vehicle to follow a straight-ahead course without the driver having to apply a constant force to overcome the tendency of the vehicle to pull to one side.

Similarly, as hereinbefore described, if a vehicle utilizing the dynamically adjustable motion stabilizer 10 of the present invention has a heavy cargo that has shifted toward one side of the vehicle, or if one or more tires on one side of the vehicle is not properly inflated, or if the vehicle is being subjected to a severe cross-wind, etc., such that the vehicle tends to veer toward one side, it is a simple matter for the user of the vehicle, while holding the steering wheel such that the vehicle follows a straight-ahead course, to cause the control mechanism 302 to activate the releasing mechanism 266, which controls the locking mechanism 264. In so doing, again, the pressure of the high pressure medium is allowed to equalize in the first chamber 278 and second chamber 280 of the centering adjustment mechanism 20. Accordingly, the motion stabilizer portion 30, which is connected in tandem with the centering adjustment mechanism 20, establishes a new centered position. The user of the vehicle then causes the control mechanism 302 to allow the releasing mechanism 266 to deactivate thereby allowing the locking mechanism 264 to automatically lock the piston 276 in its new position relative to the cylinder 270. The dynamically adjustable motion stabilizer 10 then causes the vehicle to follow a straight-ahead course without the driver having to apply a constant force to overcome the tendency of the vehicle to pull to one side.

While the present invention has been described with reference to the details of the embodiments of the invention shown in the drawings, these details are not intended to limit the scope of the invention as claimed in the appended claims.

What is claimed and desired to be covered by letters patent is:

1. A dynamically adjustable motion stabilizer for controlling motion between first and second relatively movable load members, the dynamically adjustable motion stabilizer comprising:
  (a) a motion stabilizer; and
  (b) a centering adjustment means including:
    (1) a gas spring assembly including a cylinder having a first end wall and a second end wall, a piston separating the cylinder into a first chamber and a second chamber, each chamber filled with a high pressure medium, and a stem extending from the piston to and through an orifice in the second end wall, and wherein the stem and the orifice are dimensioned to allow the stem to be displaced longitudinally relative to the orifice while retaining the high pressure medium in the cylinder,
    (2) a locking mechanism that locks the gas spring assembly, the locking mechanism including a valve head and a valve seat formed in the piston of gas spring,
    (3) a releasing mechanism that controls the locking mechanism, the releasing mechanism deactivating the locking mechanism as the valve head is spaced apart from the valve seat, and the releasing mechanism activating the locking mechanism as the valve head is spaced in abutting engagement with the valve seat; and
    (4) a control mechanism that selectively activates and deactivates the releasing mechanism; and
wherein said motion stabilizer is connected to one of the first and second load members and the centering adjustment means is connected to the motion stabilizer and the other one of the first and second load members, and wherein the centering adjustment means is structured to be dynamically adjustable.

2. The dynamically adjustable motion stabilizer as described in claim 1, wherein the releasing mechanism further includes:
  a) a stem bore extending axially through the stem;
  b) a pushrod connected to the valve head and extending through the stem bore, wherein the pushrod and stem bore are dimensioned to allow the pushrod to be displaced longitudinally relative to the stem bore while preventing the high pressure medium from escaping from the cylinder;
  c) a partial bore in fluid communication with the first chamber when the valve head is spaced apart from the valve seat;
  d) a cross-bore connecting the partial bore in fluid communication with the second chamber; and
  e) resilient means biasing the valve head into sealing engagement with the valve seat.

3. The dynamically adjustable motion stabilizer as claimed in claim 1, wherein the gas spring includes a damper.

4. A dynamically adjustable motion stabilizer for controlling motion between first and second relatively movable load members, the dynamically adjustable motion stabilizer comprising:
  a) a motion stabilizer; and
  b) a centering adjustment means, the centering adjustment means including:
    (1) a gas spring assembly having:
      (A) a cylinder having a first end wall and a second end wall;
      (B) a piston separating the cylinder into a first chamber and a second chamber, each chamber filled with a high pressure medium; and
      (C) a stem extending from the piston to and through an orifice in the second end wall; and
      (D) wherein the stem and the orifice are dimensioned to allow the stem to be displaced longitudinally relative to the orifice while retaining the high pressure medium in the cylinder;
    (2) a locking mechanism structured to lock the gas spring assembly, the locking mechanism including:
      (A) a valve seat formed in the piston; and
      (B) a valve head; and
      (C) wherein the valve head and the valve seat are structured to form a sealing engagement that prevents the high pressure medium from transferring between the first and second chambers;
    (3) a releasing mechanism structured to unlock the locking mechanism, the releasing mechanism including:
      (A) a stem bore extending axially through the stem;
      (B) a pushrod connected to the valve head and extending through the stem bore, wherein the pushrod and stem bore are dimensioned to allow the pushrod to be displaced longitudinally relative to the stem bore while preventing the high pressure medium from escaping from the cylinder;
      (C) a partial bore in fluid communication with the first chamber when the valve head is spaced apart from the valve seat;
      (D) a cross-bore connecting the partial bore in fluid communication with the second chamber; and
      (E) resilient means biasing the valve head into sealing engagement with the valve seat; and
    (4) a control mechanism structured to control the releasing mechanism; and wherein said motion stabilizer is connected to one of the first and second load members and the centering adjustment means is connected to the motion stabilizer and the other one of the first and second load members, and wherein the centering adjustment means is structured to be dynamically adjustable.

5. The dynamically adjustable motion stabilizer as described in claim 4, wherein the controlling mechanism includes:
  a) a remotely controlled activation mechanism; and
  b) a lever pivotally connected to the activation mechanism; and
  c) wherein the lever bears against and displaces the pushrod when the activation mechanism is activated, causing the valve head to be spaced apart from the valve seat.

6. The dynamically adjustable motion stabilizer as described in claim 5, wherein the activation mechanism includes a solenoid having a plunger that is drawn inwardly when the solenoid is activated and automatically returns to a non-activated position when the solenoid is de-activated.

7. The dynamically adjustable motion stabilizer as described in claim 5, wherein the activation mechanism includes a remotely controlled hydraulic cylinder.

8. The dynamically adjustable motion stabilizer as described in claim 5, wherein the activation mechanism includes a sheathed release cable.

9. A dynamically adjustable motion stabilizer for controlling motion between first and second relatively movable load members, the dynamically adjustable motion stabilizer comprising:

a) a motion stabilizer; and
b) a centering adjustment means, the centering adjustment means including:
  (1) a gas spring assembly having a cylinder with a first end wall, a second end wall, a piston that separates a first chamber from a second chamber, each filled with a high pressure medium, a stem extending from the piston to and through an orifice in the second end wall wherein the stem and the orifice are dimensioned to cooperatively allow the stem to be displaced longitudinally relative to the orifice while retaining the high pressure medium in the second chamber;
  (2) a locking mechanism including a valve head and a valve seat that sealingly engages the valve seat to prevent and control transfer of the high pressure medium between the first chamber and the second chamber;
  (3) a releasing mechanism including a pushrod connected to the valve head and extending through a bore defined axially lengthwise through the stem wherein the pushrod and bore are dimensioned to cooperatively allow the pushrod to be displaced longitudinally relative to the bore while preventing the high pressure medium from escaping from the first chamber, a partial bore in fluid communication with the first chamber when the valve head is not in sealing engagement with the valve seat, a cross-bore connecting the partial bore in fluid communication with the second chamber, a spring that biases the valve head into said sealing engagement with the valve seat;
  (4) an outer cover extending beyond the centering adjustment mechanism to provide a platform for mounting an attachment member; and
  (5) a control mechanism including a solenoid mounted on the outer cover, the solenoid having a plunger that is drawn inwardly when the solenoid is activated and automatically returns to its non-activated position when the solenoid is de-activated, a lever having a proximal end pivotally connected to the plunger and a distal end pivotally connected to a pivot bracket mounted on an internal surface of the outer cover, a sealing spring, and electrical connections connected to a power source through a switch mechanism; and
  (6) wherein the solenoid, the lever, and the pivot bracket are dimensioned and spaced wherein the lever bears against the distal end of, and longitudinally displaces, the pushrod when the solenoid is activated to cause the valve head to be spaced apart from the valve seat and wherein, when the plunger returns to its non-activated position when the solenoid is deactivated, the sealing spring longitudinally displaces the pushrod causing the valve head to again sealingly engage the valve seat; and wherein said motion stabilizer is connected to one of the first and second load members and the centering adjustment means is connected to the motion stabilizer and the other one of the first and second load members, and wherein the centering adjustment means is structured to be dynamically adjustable.

10. A method of dynamically adjusting a motion stabilizer attached to one of two loads, comprising the steps of:
  a) providing a variable-length adjustment mechanism having:
    (1) a gas spring assembly including a cylinder having a first end wall and a second end wall, a piston separating the cylinder into a first chamber and a second chamber, each chamber filled with a high pressure medium, and a stem extending from the piston to and through an orifice in the second end wall, and wherein the stem and the orifice are dimensioned to allow the stem to be displaced longitudinally relative to the orifice while retaining the high pressure medium in the cylinder,
    (2) a locking mechanism that locks the adjustment mechanism at a selected length, the adjustment mechanism connected between the motion stabilizer and the other one of the two loads, the locking mechanism including a valve head and a valve seat, formed in the piston of the gas spring, and
    (3) a releasing mechanism that controls the locking mechanism, the releasing mechanism deactivating the locking mechanism as the valve head is spaced apart from the valve seat, and the releasing mechanism activating the locking mechanism as the valve head is spaced in abutting engagement with the valve seat;
  b) applying a force to the adjustment mechanism under operating conditions to cause the adjustment mechanism in combination with the motion stabilizer to assume a new length in order to oppose a dynamic changed condition being monitored by the motion stabilizer;
  c) releasing the locking mechanism allowing the adjustment mechanism in connection with the motion stabilizer to adjust to said new length; and
  d) causing the locking mechanism to lock the adjustment mechanism to thereby retain said new length after the applied force is removed.

* * * * *